United States Patent [19]

Greenlaw

[11] Patent Number: 5,076,701
[45] Date of Patent: Dec. 31, 1991

[54] REAR VIEW MIRROR FOR SECUREMENT TO A PROTECTIVE HEADGEAR

[76] Inventor: John W. Greenlaw, 4120 Morgan Territory Rd., Clayton, Calif. 94517

[21] Appl. No.: 697,718
[22] Filed: May 9, 1991
[51] Int. Cl.⁵ .................................................. G02B 7/18
[52] U.S. Cl. ...................................... 359/879; 359/871
[58] Field of Search ............... 350/352, 631, 638, 639; 351/50

[56] References Cited

U.S. PATENT DOCUMENTS

| D. 284,462 | 7/1986 | Greenlaw et al. | D12/189 |
| D. 286,395 | 10/1986 | Greenlaw et al. | D12/189 |
| 4,307,885 | 12/1981 | Pidcock | 350/638 |
| 4,490,012 | 12/1984 | Magisuke | 350/638 |
| 4,603,944 | 8/1986 | Greenlaw et al. | 350/252 |

FOREIGN PATENT DOCUMENTS

| 0765465 | 6/1934 | France | 350/638 |
| 0405521 | 6/1933 | United Kingdom | 350/638 |

Primary Examiner—Bruce Y. Arnold
Assistant Examiner—Ryan
Attorney, Agent, or Firm—Bruce & McCoy

[57] ABSTRACT

An optical device for permitting a person to secure an improved rear view mirror to a protective headgear which can be adjusted to variable operative positions spaced in front of his eye.

7 Claims, 3 Drawing Sheets

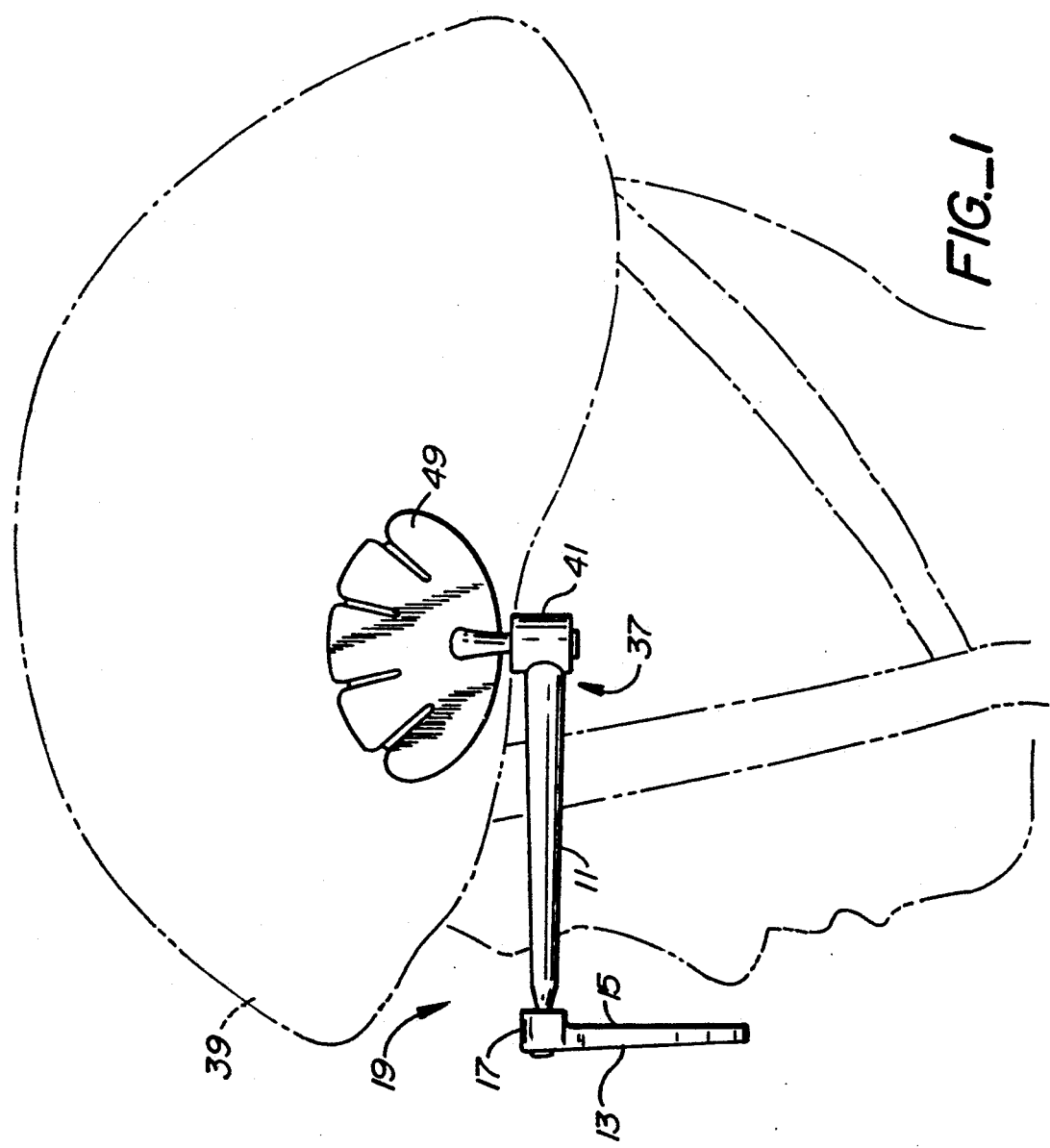
FIG._1

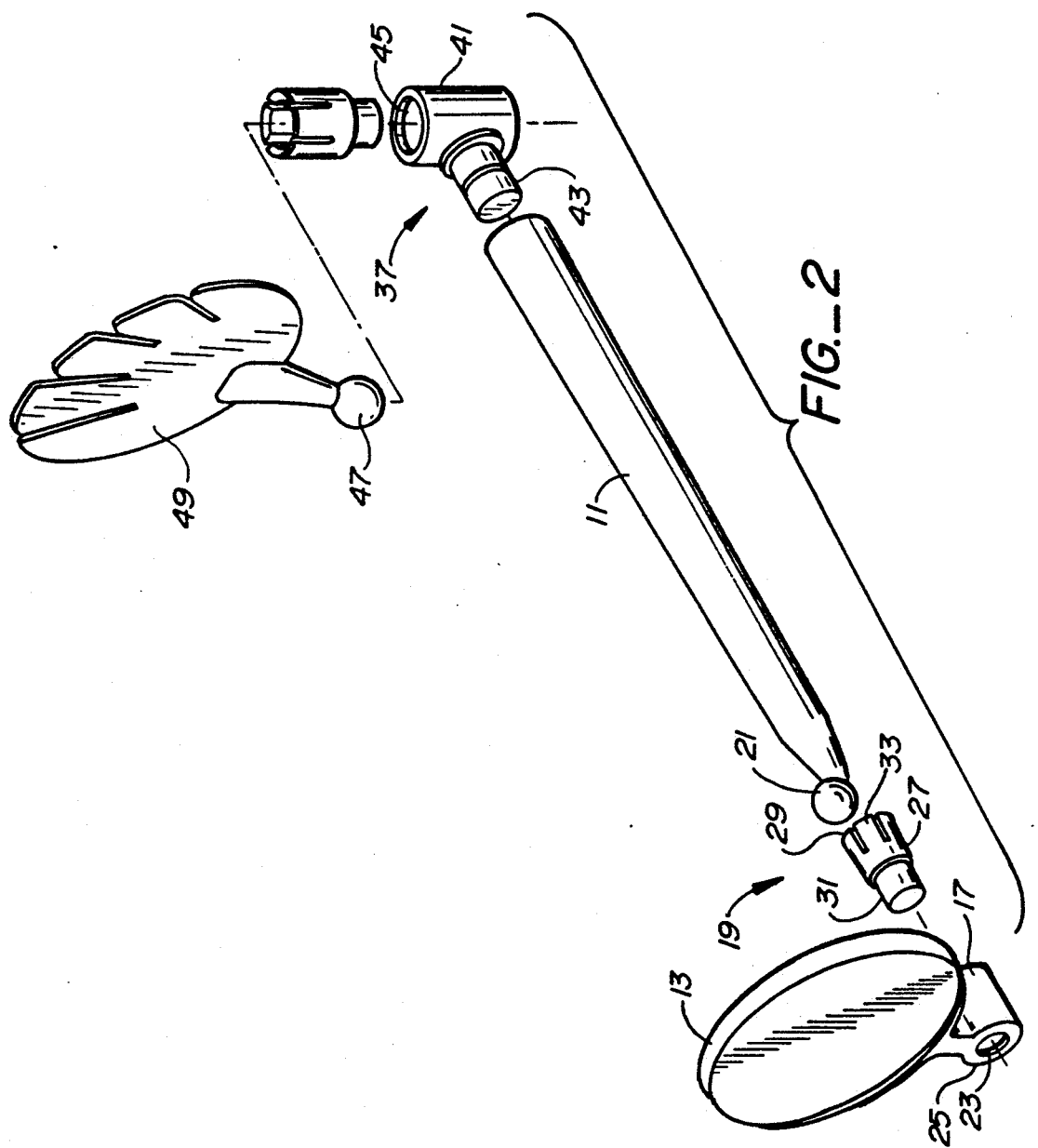
FIG._2

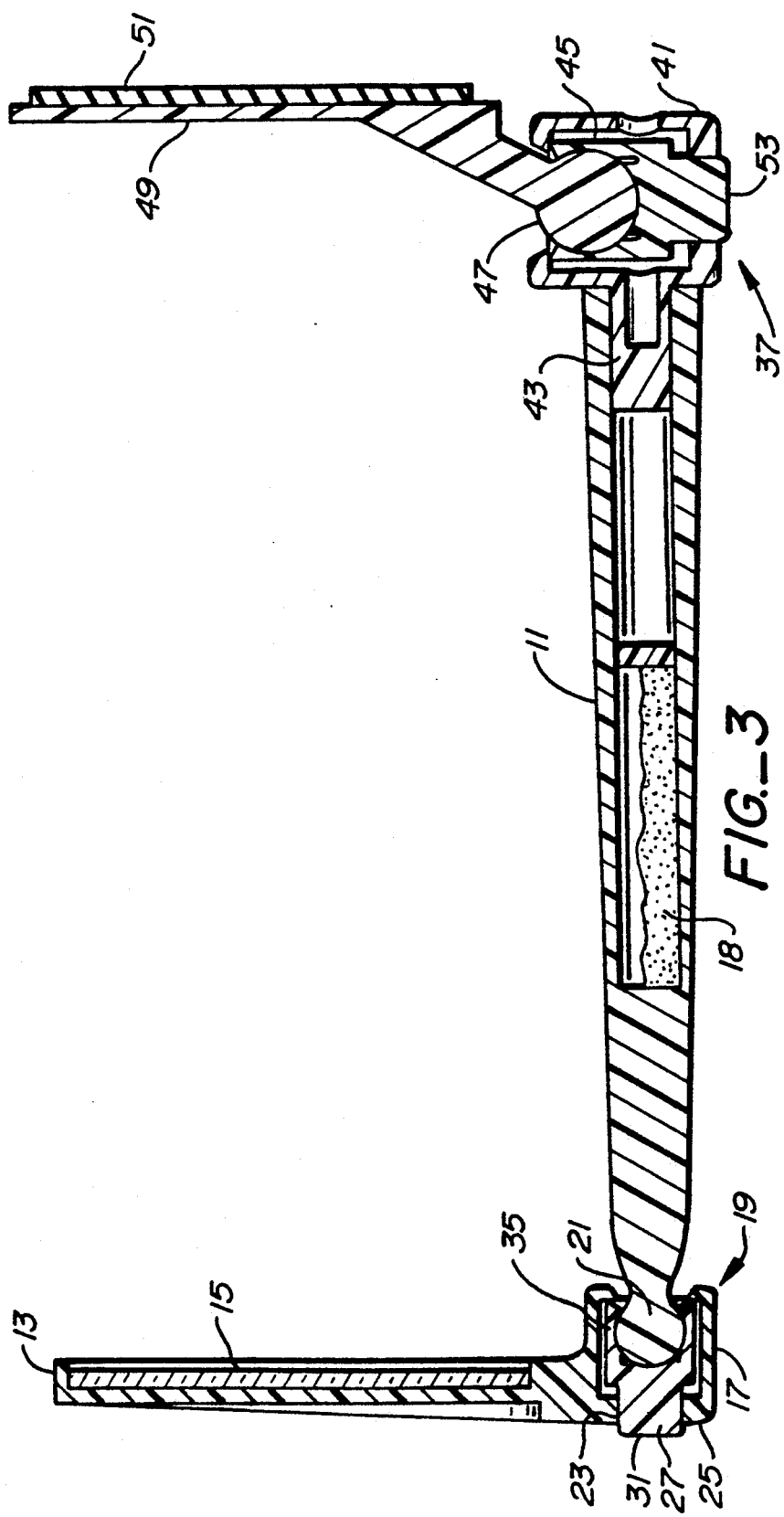

REAR VIEW MIRROR FOR SECUREMENT TO A PROTECTIVE HEADGEAR

FIELD OF THE INVENTION

The present invention relates to optical devices and more particularly to an improved rear view mirror which can be mounted on the protective headgear or CRASH HELMET of a bicycle or motorcycle rider whereby the reflecting mirror can be adjusted to variable operative positions in front of the eye of the rider.

DESCRIPTION OF THE PRIOR ART

With the popularization of bicycle riding as a form of exercise, rear view mirrors have been developed which are worn by the rider for increased safety rather than being mounted on the handle bars or frame of the bicycle. Small lightweight designs are utilized which can be attached to a protective helmet or to an eyeglasses frame. They permit riders to see traffic approaching from the rear without having to take their eyes off of the road ahead of them or to readjust their position on the bicycle in order to focus traffic approaching from the rear in a bike mounted mirror such as by sitting down from a standing position.

It is desireable for a bicycle rider to see to the rear without turning his head to look because even the momentary distraction of a rider from watching the road ahead can cause an accident. Hitting a small rock or stone or patch of gravel can dump the bicycle and possibly cause severe injury to the rider. Likewise, looking to the rear can cause a rider to swerve when it is very dangerous to do so such as when a car is about to pass the rider. Still, it is very dangerous for the bicycle rider not to be aware of traffic approaching from behind because he or she is often riding further out in the traffic lane than is safe when being passed by an automobile or a truck. When traffic approaching from behind is about to pass, the rider needs to squeeze against the right hand margin of the road surface to provide safe and adequate clearance between the rider and the overtaking vehicle. Thus, the need to know each time traffic is about to pass the rider is critical.

The present invention is an improved version of the device disclosed in U.S. Pat. No. 4,603,944 issued Aug. 5, 1986, for an OPTICAL DEVICE FOR AN INDIVIDUAL to John W. Greenlaw, Gary R. Schlueter, and Karsten Kettlitz. The improvements include a new means for mounting the device on a protective headgear or crash helmet, providing an improved means for disassembling the device for storage and repair, and providing a self dampening system to reduce vibration in the device.

New types of helmets that are popular with bicycle riders do not have a hard shell to clamp the rear view mirror device of the prior art to. Some helmets are made of foam plastic, such as urethane, and are provided with a cloth cover, usually Lycra, which is an elastic woven fabric with a colorful shiny finish. The device of the present invention is designed to adhere to either a hard shell or foam type of helmet by means of an adhesive.

The prior art rear view mirrors as described in U.S. Pat. No. 4,603,944 had articulating joints which could not be disassembled without destroying the joints or severely compromising their integrity. Once a socket joint was assembled by pushing the parts together, a reverse pulling force only tends to tighten the engagement of the parts until sufficient deformation of the structure causes it to come apart with the possibility of resulting permanent strain remaining in the parts.

There are several reasons for requiring a disassembly capability. An obvious reason is to be able to replace broken parts. Another reason is to be able to remove the fragile projecting portions of the device from the helmet for storage or handling to prevent damage occurring to the device. A further reason is, for helmets having a fabric cover, the attachment member for securing the device to the helmet can be placed under the cover and the mirror portions secured to the attachment member through a small hole in a cover at a detachable joint.

A third problem with prior art devices is that they are lightweight and have very low dynamic stability whereby they vibrate quite readily when a rough road surface is encountered. The present invention includes a self-induced dampening feature to reduce natural vibrations in the rear view mirror.

SUMMARY OF THE INVENTION

The present invention is an improved rear view mirror for securement to a bicycle rider's protective headgear. It includes an extension bar having a holder for a rear view mirror mounted on one end thereof with a reflecting mirror mounted therein. An adjustable connection is provided between the extension bar and the mirror holder. It includes a ball formed on the end of the bar and a receptacle formed on the peripheral edge of the mirror holder. The receptacle has an aperture formed in the rear wall thereof.

A separate socket member is provided which is formed to encapsulate at least a portion of the ball formed on the end of the extension bar. The socket is also formed to fit in captured relation within the receptacle formed on the holder. The socket member includes a rounded internal cavity to mate with and partially encapsulate the ball formed at the end of the extension bar. Slots extending from the open end of the socket are formed in the longitudinal sidewalls of the socket extending from the open end thereof to permit the sidewalls to expand when the ball formed at the end of the bar is pushed into the socket. The sides of the socket then contract around the ball when it is seated in the socket. The external configuration of the socket is formed to mate and fit snugly within the receptacle on the holder. The socket includes a projection formed on the rear end thereof to project through the aperture formed the rear wall of the receptacle.

The external configuration of the socket member is formed to mate and fit snugly within the receptacle of the adjustable connection formed on the mirror holder. The receptacle includes a retaining lip formed adjacent to the internal peripheral edge of the receptacle formed on the mirror holder for retaining the socket member in the receptacle after it has been pushed into the receptacle cavity beyond the retaining lip. The aperture formed in the rear wall thereof is disposed on the opposite side of the internal cavity from the receptacle retaining lip whereby when the socket is engaged in the receptacle, the projection on the socket extends through the aperture and beyond the rear wall when the socket is seated in the cavity.

A flat malleable plastic fan-like structure is provided which is secured to the end of the extension bar at the opposite end thereof from the mirror holder whereby the end of the extension bar can be secured to the curved surface of the protective headgear of a bicycle rider with adhesive by means of the fan.

In a preferred embodiment, the extension bar of the improved rear view mirror is formed with a hollow core which is partially filled with a powdered or granular metal which dampens oscillatory motion of the bar.

OBJECTS OF THE INVENTION

It is therefore an important object of the present invention to provide a rear view mirror which can be attached to either a hard or foam type of bicycle rider helmet and one having a fabric cover.

It is another object of the present invention to provide a rear view mirror which can be partially detached from bicycle rider's protective headgear when the helmet is not in use.

It is a further object of the present invention to provide a means for disassembling the components of a bicycle rider's personally worn rear view mirror having articulating joints.

It is still another object of the present invention to new and novel ball and socket swivel mechanism device which can be disengaged without permanent deformation of the parts.

It is still a further object of the present invention to provide an inexpensive, lightweight, highly adjustable extension arm for supporting a rear view mirror on a bicycle rider's helmet which has a self dampening feature to reduce vibration in the device.

Other objects and advantages of the present invention will become apparent when the preferred embodiments thereof as described in this specification are considered in conjunction with the accompanying drawings.

DESCRIPTION OF THE DRAWINGS

FIG. 1 is a perspective view of a preferred embodiment of the rear view mirror of the present invention mounted on a bicycle rider's protective headgear.

FIG. 2 is an exploded view in perspective of the preferred embodiment of the present invention; and FIG. 3 is a side elevation thereof in cross-section.

DESCRIPTION OF THE PREFERRED EMBODIMENT

The present invention is an improved rear view mirror for securement to a bicycle rider's protective headgear. Reference is made to the drawings for a description of the preferred embodiment of the present invention wherein like reference numbers represent like elements on corresponding views.

The purpose of the present invention is to permit the adjustable placement of a rear view mirror in front of the eye of bicycle rider for rear view surveillance. The mirror is secured to the protective headgear of the rider with a partially detachable connection whereby the more delicate portions of the device can be removed from the helmet when it is not in use to avoid inadvertent damage to the mirror by unanticipated abuse or mishandling.

Reference is made to FIGS. 1-3. The rear view mirror includes an extension bar 11 having a mirror holder 13 mounted at one end of the bar. The extension bar is formed as a hollow tapering shaft with a circular internal cross-section. The external configuration is flat sided to provide additional strength. In the preferred embodiment, the external cross-section is octagonal to keep the wall thickness relatively thin although obviously the outer configuration could be either round or multi-sided of a greater or lesser number than eight and the internal cross-section another configuration rather than circular. The mirror holder 13 and the mirror 15 mounted therein are round, although they could be any other configuration, and a socket receptacle 17 is mounted on the holder. The hollow interior 18 of the extension bar is partially filled with powdered or granular metal or other dense loose material which bounces inside the cavity in response to vibration of the extension bar and thereby counteracts or dampens any oscillatory movement. A plug at the end of the cavity is glued in place to seal the powdered metal therein.

An adjustable connection 19 is disposed between the extension bar 11 and the mirror holder 13. It includes a ball 21 formed on the end of the extension bar which acts as a swivel post, or entrapped surface, about which the mirror holder can be rotated to variable positions with respect to the extension bar. In the preferred embodiment, the attachment of the ball to the extension bar is angled with respect to the longitudinal axis of the bar and is comprised of a solid molding which is formed integral to the smaller end of the tapered extension bar. The angulation of the ball allows a wider range of adjustment of the mirror holder with respect to the extension bar. It will be seen that the extension bar can be rotated in its mount whereby the increased range of adjustment with respect to the extension bar extends 360° therearound. The material which forms the parts of the rear view mirror, apart from the reflecting glass, is a slightly deformable lightweight material with considerable strength such as nylon or any other similar plastic.

The receptacle 17 formed on the mirror holder 13 is disposed on the peripheral edge thereof and has an aperture 23 formed in its rear wall 25. The ball 21 formed on the end of the extension bar 11 fits into the receptacle and is locked therein with a compression fitting 27, called a socket member, which is formed to encapsulate at least a portion of the ball surface formed on the extension bar. The socket 27 is also configured to fit within the receptacle 17 formed on the periphery of the mirror holder in captured relation therein. The socket member includes a spherical internal cavity formed to mate with the ball 21 disposed on the extension bar. The external configuration of the socket member 27 is generally of a slightly tapered cylinder. Slots 29 are formed in the longitudinal sides of the socket 27 extending from the open end of the socket partially along the longitudinal length of the walls of the socket. These slots permit the sides of the socket member to expand when the ball on the extension bar is pushed into the open end of the socket. This occurs because the open end of the socket is provided with a slightly smaller diameter than the internal configuration thereof which receives the ball, and the open end a slightly smaller diameter than the ball, but larger than the diameter of the end of the extension bar, for capturing the ball in the cavity formed in the socket. The rear end of the socket member is provided with a projection 31 aligned with the cylindrical axis of the socket and which is formed to extend through the aperture 19 disposed in the rear wall 25 of the receptacle whereby it projects beyond said rear wall.

When the ball end 21 of the extension bar 11 is forced into the socket 27 to be seated therein, the expandable sides of the socket first expand to allow the passage of the ball into the socket member and then contract around the ball when it is seated in the socket thereby capturing the ball internally in the socket but with a swivel connection which permits the socket member to partially rotate freely around the ball. The socket acts as a bearing member for the ball.

The socket member 27 with the captured ball 21 is then inserted into the receptacle on the periphery of the mirror holder 13. The external configuration of the socket is formed to mate and fit snugly within the receptacle which has a mating female configuration. The slightly tapered cylindrical external surface of the socket member, with the larger diameter disposed at the open end, is squeezed when the socket is fitted into the receptacle on the holder to securely retain the ball on the extension bar. The projecting tong-like members 33, formed by the socket member side walls between the slots, allow a collapsing deformation of the sides of the socket around the ball. The receptacle 17 is recessed to form a retaining lip 35 adjacent to the internal peripheral edge of the open end of the receptacle on the mirror holder. This lip retains the socket 27 in the receptacle after the socket has been pushed into the receptacle beyond the retaining lip. Any withdrawal force exerted by pulling on the extension bar 11, and thereby the ball 21, tends to expand the tongs 33 on the socket member, inside or behind the lip, locking the ball and socket member more firmly in the receptacle. Only excessive force can effect disassembly or withdrawal of the ball and socket member from the receptacle whereby either the socket member or the receptacle or both are severely deformed or permanently strained or at least the integrity of the joint is compromised.

The projection 31 at the rear of the socket member 27 extends through an opening 23 in the rear wall 25 of the cavity in the receptacle a preselected distance whereby the socket can be pushed back out of the receptacle cavity by means of pressure on the projection. If the ball 21 is kept deeply seated in the socket member as the projection is pushed, the tongs 33 on the socket member can be collapsed around the ball and the extension bar 11, to the same degree as occurs during assembly of the articulating joint 19, and the assembly pushed past the internal lip 35 of the receptacle cavity without damaging deformation. Simply pulling on the ball 21 tends to tighten the socket in the receptacle cavity by expanding the socket 27.

The extension bar 11 includes a second adjustable connection 37 similar to the first one 19 interconnecting the mirror holder 13 to the extension bar. This second adjustable connection 37 is disposed on the opposite end of the extension bar from the mirror holder 13. This double adjustable connection arrangement permits the mirror to be articulated more flexibly in relation to the eye of the wearer. The axis of the swivel post of this second adjustable connection 37 is disposed at right angles to the major longitudinal axis of the extension bar 11. The socket receptacle portion 41 of the second adjustable connection is formed in a right angle pipe section, like a smoking pipe with a pipe bowl and stem, which is secured to the end of the hollow tapering shaft of the extension bar opposite from the ball end 21. The pipe stem 43 of the socket receptacle portion 41 is secured into the open end of the extension bar cavity with glue to seal the powdered metal in the hollow core. The pipe bowl portion 45 of the right angle pipe section forms the receptacle for the ball socket member 47 of the second adjustable connection.

A flat malleable fan-like structure 49 is provided for securing the rear view mirror to the curved surface of the protective headgear 39 of a bicycle rider. Bicycle riders most in need of a rear view mirror are those competitive, serious riders who move at high rates of speed on streets rather than slower moving riders who pedal on the sidewalks or in parks. Likewise, those persons who ride at higher speeds are also concerned with safety and usually wear a protective helmet to which the present invention can be adapted by providing an appropriate means of securing the rear view mirror to the helmet. The a flat malleable fan is provided with a double sided adhesive layer 51 for securing the opposite end of the extension bar, from said mirror holder, to the protective headgear or helmet of the rider. The paper covering of the double stick adhesive is pulled off and the fan member can be manually deformed to contact the curved surface of the headgear and stick it thereto. The fan member can be attached to either side of the helmet which is an improvement over the prior art which can only be attached to the left side of a helmet.

The swivel connection 37 at the in board end of the extension bar 11 permits the mirror to be moved outward or inward from the wearer's head depending upon the users preference. Generally it has been found that mounting the inboard end frame above the wearer's ear permits the mirror to be moved directly in front of the wearer's eye whereby it can be more easily moved inboard or outboard and then finally adjusted by rotating the mirror holder for perfect rear viewing.

When the helmet is removed, the extension bar and the mirror holder can be detached from the helmet as a unit simply by pressing the projection 45 in the second adjustable connection whereby the removed assembly can be protected against inadvertent damage when the helmet is not being worn.

Thus, it will be seen from the description of the preferred embodiment of the present invention that all of the objects and advantages attributable thereto have been attained. While the invention has been described in considerable detail, the invention is not to be limited to such details as have been set forth except as may be necessary by the appended claims.

I claim:

1. An improved rear view mirror for securement to a protective headgear comprising
    an extension bar having a holder for a rear view mirror mounted at one end thereof with a reflecting mirror mounted therein,
    an adjustable connection between said extension bar and said mirror holder including
        a ball formed on the end of said bar,
        a receptacle formed on the peripheral edge of said holder with an aperture formed on the rear wall thereof, and
        a separate socket formed to encapsulate at least a portion of the ball formed on said bar and to fit in captured relation within the receptacle formed on said holder,
            said socket member including a rounded internal cavity to mate with and partially encapsulate the ball on said bar, said socket member including slots formed in the longitudinal side walls of said socket extending from the open end thereof to permit the side walls of said socket to expand when the ball on said bar is pushed into said socket, the external configuration of said socket being formed to mate and fit snugly within the receptacle on said holder, said socket member including a projection formed on the rear end thereof to project through the aperture in the rear wall of said receptacle, said receptacle including a retaining lip formed adjacent to the internal peripheral edge thereof for retaining said socket member in said receptacle after said socket has been pushed into said receptacle beyond said retaining lip, said aperture formed in the rear wall thereof being disposed on the opposite side of the internal cavity from said receptacle retaining lip whereby when said socket is engaged in said receptacle, the projection on said socket extends through said aperture and beyond the rear wall thereof, a flat malleable fan-like structure secured to the end of said extension bar opposite from said rear view mirror holder for securing said end of said bar to the curved surface of the protective headgear of the rider with adhesive.

2. The improved rear view mirror of claim 1 wherein said means for securing the end of said extension bar opposite from said mirror holder to the head gear of a rider includes a second adjustable connection similar to the one interconnecting said mirror holder to said extension bar, said second adjustable connection disposed at the opposite end of the extension bar from said ball adjacent to said fan structure for securing said extension bar to the headgear of a rider whereby said mirror can be articulated in relation to the eye of the wearer at either end of the extension bar, said second adjustable connection being engaged to a stem member formed at the bottom of the fan structure.

3. The improved rear view mirror of claim 2 wherein the ball end of the extension bar is angled slightly with resoect to the major longitudinal axis of the extension bar and the swivel axis of the second adjustable connection is disposed at approximately right angles to said major longitudinal axis of said extension bar.

4. The optical device of claim 3 wherein said extension bar is formed as a hollow tapering shaft with a circular internal cross section for lightweight strength, said hollow core of said bar partially filled with a powdered or granular metal.

5. The improved rear view mirror of claim 4 wherein the receptacle portion of the second adjustable connection is formed in a right angle pipe section secured to the opposite end of the hollow tapering extension bar from said ball end thereof, said extension bar being secured to the pipe stem of the pipe section and the pipe bowl of the pipe section forms the receptacle for the ball socket member of the second adjustable connection.

6. The improved rear view mirror of claim 4 wherein the attachment of the ball to said extension bar for supporting said mirror holder is angled slightly with respect to the longitudinal axis of said extension bar.

7. An improved rear view mirror for securement to a protective headgear comprising an extension bar having a holder for a rear view mirror mounted at one end thereof with a reflecting mirror mounted therein, said extension bar being formed as a hollow tapering shaft with a circular internal cross-section, said extension bar terminating in a ball for supporting said mirror holder, said ball end of said extension bar being angled slightly with respect to the major longitudinal axis of said extension bar, said hollow core of said bar being partially filled with powdered or granular metal, an adjustable connection between said extension bar and said mirror holder including
   a receptacle formed on the peripheral edge of said mirror holder with an aperture formed in the rear wall thereof,
   a separate socket member formed to encapsulate at least a portion of the ball formed on said extension bar and to fit in a captured relation within the receptacle formed in said holder, said socket member including a rounded internal cavity to mate with and partially encapsulate the ball on said bar, said socket member including slots formed in the longitudinal side walls of said socket extending from the open end thereof to permit the side walls of said socket to expand when the ball on said bar is pushed into said socket, the external configuration of said socket being formed to mate and fit snugly within the receptacle on said holder,
   said socket including a projection formed on the rear end thereof to project through the aperture in the rear wall of said receptacle,
   said receptacle including a retaining lip formed adjacent to the internal peripheral edge thereof for retaining said socket in said receptacle after said socket has been pushed into said receptacle beyond said retaining lip, said aperture formed in the rear wall thereof being disposed on the opposite side of the internal cavity from said receptacle retaining lip whereby when said socket is engaged in said receptacle, the projection on said socket extends through said aperture and beyond the rear wall thereof, a flat malleable fan-like structure secured to the end of said extension bar opposite from said rear view mirror holder for securing said end of said bar to the curved surface of the protective headgear of the rider with adhesive, means for securing the end of said extension bar opposite from said mirror holder to said fan-like structure, including
   a second adjustable connection similar to the one interconnecting said mirror holder to said extension bar, said second adjustable connection disposed at the opposite end of the extension bar from said ball end and adjacent to said fan for securing said extension bar to the headgear of a rider whereby said mirror can be articulated in relation to the eye of the wearer, the swivel post axis of the second adjustable connection being disposed at approximately right angles to the major longitudinal axis of said extension bar, said second adjustable connection including a socket receptacle portion in the form of right angle pipe section secured to the extension bar with the pipe stem of the pipe section forming a plug and the pipe bowl of the pipe section forming the receptacle for the ball socket member of the second adjustable connection.

* * * * *